US010893163B2

(12) United States Patent
Kunimatsu

(10) Patent No.: US 10,893,163 B2
(45) Date of Patent: *Jan. 12, 2021

(54) NON-TRANSITORY COMPUTER-READABLE RECORDING MEDIUM STORING INSTRUCTIONS CAUSING IMAGE OUTPUTTING DEVICE TO EXECUTE OUTPUTTING OPERATION

(71) Applicant: BROTHER KOGYO KABUSHIKI KAISHA, Aichi (JP)

(72) Inventor: Akihiro Kunimatsu, Okazaki (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,003

(22) Filed: Dec. 17, 2019

(65) Prior Publication Data

US 2020/0128147 A1    Apr. 23, 2020

Related U.S. Application Data

(63) Continuation of application No. 16/249,192, filed on Jan. 16, 2019, now Pat. No. 10,516,796, which is a
(Continued)

(30) Foreign Application Priority Data

Aug. 19, 2016    (JP) ................................. 2016-161109

(51) Int. Cl.
*H04N 1/00*    (2006.01)
*H04N 1/32*    (2006.01)
(Continued)

(52) U.S. Cl.
CPC ..... *H04N 1/00973* (2013.01); *H04N 1/00204* (2013.01); *H04N 1/00244* (2013.01);
(Continued)

(58) Field of Classification Search
CPC ....................... H04N 1/00973; H04N 1/00204
See application file for complete search history.

(56) References Cited

U.S. PATENT DOCUMENTS

| 8,209,716 B2* | 6/2012 | Michel | H04N 21/26606 |
| | | | 725/38 |
| 9,001,340 B2* | 4/2015 | Miyazawa | H04N 1/00244 |
| | | | 358/1.13 |
| 2010/0115536 A1 | 5/2010 | Yasui | |

FOREIGN PATENT DOCUMENTS

| JP | 2002-149365 A | 5/2002 |
| JP | 2010-108397 A | 5/2010 |

OTHER PUBLICATIONS

Notice of Allowance dated Jun. 22, 2018 from U.S. Appl. No. 15/669,110.
(Continued)

*Primary Examiner* — Ibrahim Siddo
(74) *Attorney, Agent, or Firm* — Scully, Scott, Murphy & Presser, PC

(57) ABSTRACT

A non-transitory computer-readable recording medium stores instructions which cause, when executed by a processor, a computer to obtaining designated data and designated condition information. The designated data includes the image data and, the designated condition information indicates multiple designated parameters respectively corresponding to multiple items constituting an execution condition for an outputting operation. The instructions cause the computer to transmit parameter request information to a server, receive parameter instruction information including recommendable parameters associated with the group identifying information from the server as a response to the parameter request information, cause the image outputting device to execute the outputting operation using the recommendable parameters included in the parameter instruction
(Continued)

information as the parameters for the particular items, and using the designated parameters for the other items.

20 Claims, 9 Drawing Sheets

Related U.S. Application Data continuation of application No. 15/669,110, filed on Aug. 4, 2017, now Pat. No. 10,218,868.

(51) Int. Cl.
*G06F 3/0481* (2013.01)
*G06F 3/0482* (2013.01)
*G06F 3/12* (2006.01)

(52) U.S. Cl.
CPC ....... *H04N 1/32122* (2013.01); *G06F 3/0482* (2013.01); *G06F 3/04817* (2013.01); *G06F 3/12* (2013.01); *H04N 2201/0039* (2013.01); *H04N 2201/0055* (2013.01); *H04N 2201/0075* (2013.01); *H04N 2201/0094* (2013.01); *H04N 2201/3202* (2013.01); *H04N 2201/3208* (2013.01); *H04N 2201/3266* (2013.01)

(56) References Cited

OTHER PUBLICATIONS

Office Action dated Aug. 8, 2019 from U.S. Appl. No. 16/249,192.
Notice of Allowance dated Aug. 22, 2019 from U.S. Appl. No. 16/249,192.

\* cited by examiner

FIG. 3A

| GROUP ID | PROGRAM ID | TIME INFORMATION | PARTICULAR ITEM "RECOMMENDABLE PARAMETER" |
|---|---|---|---|
| A COUNTRY | — | — | SILENT MODE "ON" |
| B COUNTRY | NEW YEAR'S CARD APPLICATION | DECEMBER | SIZE "POSTCARD", SHEET TYPE "GLOSSY" |
| C COMPANY | — | — | COLOR "MONOCHROMATIC" |

FIG. 3B

| ITEM | INITIAL PARAMETER |
|---|---|
| SIZE | A4 |
| COLOR | COLOR |
| SHEET TYPE | PLAIN SHEET |

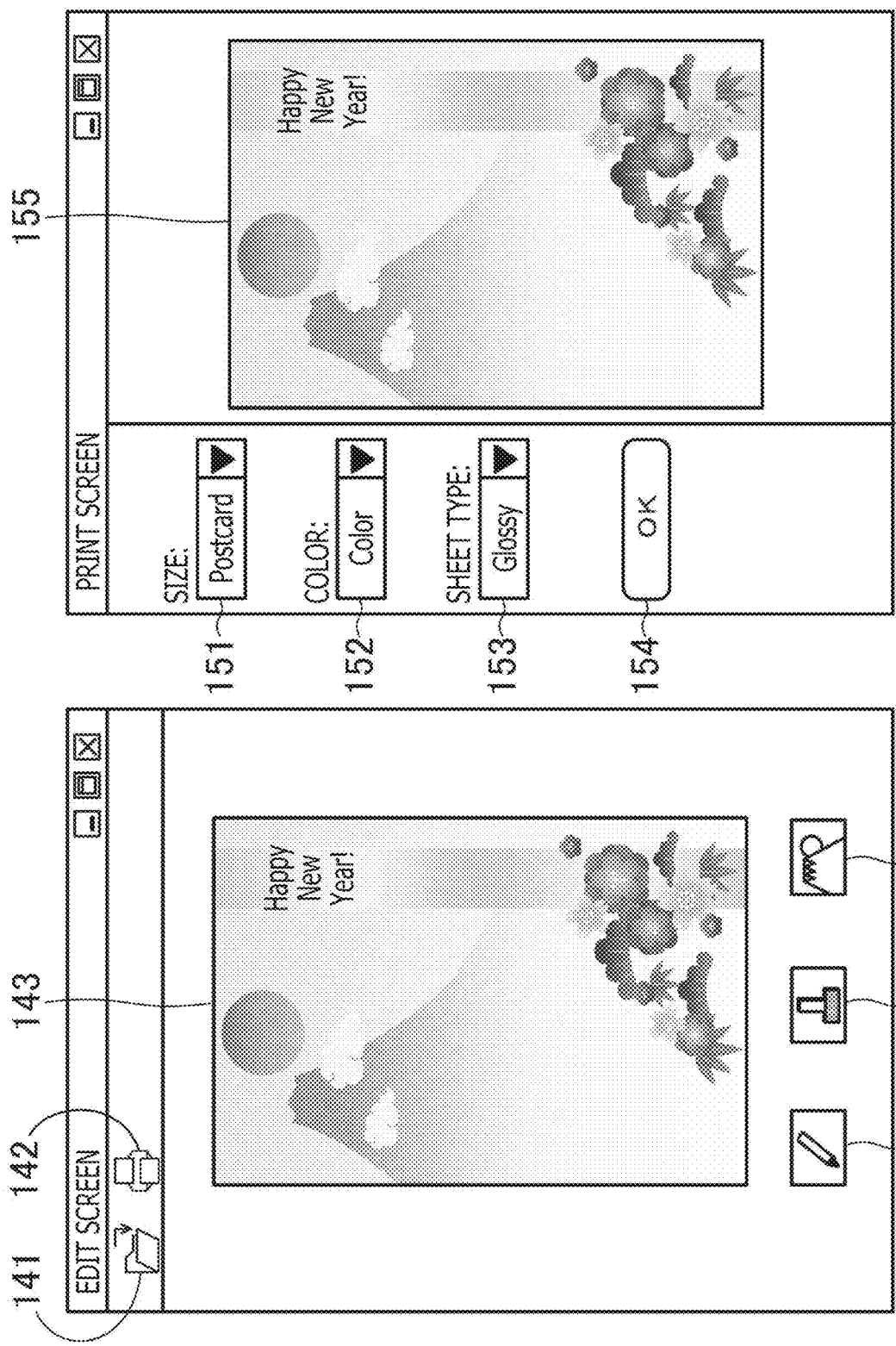

NON-TRANSITORY COMPUTER-READABLE RECORDING MEDIUM STORING INSTRUCTIONS CAUSING IMAGE OUTPUTTING DEVICE TO EXECUTE OUTPUTTING OPERATION

CROSS-REFERENCE TO RELATED APPLICATIONS

This application is a continuation application of U.S. Ser. No. 16/249,192 filed on Jan. 16, 2019, which is a continuation application of U.S. Ser. No. 15/669,110 filed on Aug. 4, 2017, now U.S. Pat. No. 10,218,868 granted on Feb. 26, 2019 and claims priority under 35 U.S.C. § 119 from Japanese Patent Application No. 2016-161109 filed on Aug. 19, 2016. The entire subject matter of the applications is incorporated herein by reference.

BACKGROUND

Technical Field

The present disclosures relate to a non-transitory computer-readable recording medium storing instructions which cause, when executed by a controller of a computer, the computer to control an image outputting device to execute an outputting operation in accordance with an execution condition designated by a user.

Related Art

Conventionally, there has been known a driver program, which includes instructions causing a printer to execute a printing operation according to an executing condition designated by a user. According to such a driver program, the user is required to designate multiple parameters respectively corresponding to multiple items constituting the execution condition.

SUMMARY

Recently, due to diversification of mode of use of a printer, it is necessary to use an appropriate execution condition from among various execution conditions. It is noted that, if multiple programs are to be optimized to respective modes of use are developed, a developing cost will become extremely high.

According to aspects of the disclosures, there is provided a non-transitory computer-readable recording medium for a computer which has a processor, a memory and a communication interface, the computer being connected to an image outputting device configured to execute an outputting operation in accordance with image data. The non-transitory recording medium stores instructions which cause, when executed by the processor, the computer to obtain designated data and designated condition information which have been designated by a user from an external program stored in the memory, the designated data being image data generated by the external program in accordance with an input through the user interface and including the image data subjected to the outputting operation, the designated condition information indicating multiple designated parameters respectively corresponding to multiple items constituting the execution condition for the outputting operation, transmit parameter request information to a server through the communication interface, the parameter request information including group identifying information identifying a group to which the computer belongs, the parameter request information being information requesting the server to transmit recommendable parameters corresponding to particular items which are parts of the multiple items, the recommendable parameters relating to the group identifying information, receive parameter instruction information including the recommendable parameters associated with the group identifying information from the server through the communication interface as a response to the parameter request information, and cause the image outputting device to execute the outputting operation using the recommendable parameters included in the parameter instruction information as the parameters for the particular items, and using the designated parameters for the other items.

According to aspects of the disclosures, there is also provided a non-transitory computer-readable recording medium for a computer which has a processor, a memory and a communication interface, the computer being connected to an image outputting device configured to execute an outputting operation in accordance with image data. The non-transitory recording medium stores instructions which cause, when executed by the processor, the computer to obtain, from an external program stored in the memory, transfer requirement information requesting to transfer recommendable condition information, the recommendable condition information including multiple parameters respectively corresponding to multiple items constituting an execution condition of the outputting operation, transmit parameter request information to a server through the communication interface, the parameter request information including group identifying information which identified a group to which the computer belongs, the parameter request information being information requesting the server to transmit recommendable parameters corresponding to particular items which are parts of the multiple items, the recommendable parameters being parameters related to the group identifying information, receive parameter instruction information including the recommendable parameters associated with the group identifying information from the server through the communication interface as a response to the parameter request information, transfer the recommendable condition information including the recommendable parameters included in the parameter instruction information to the external program in response to the transfer requirement information so that the external program can identify the recommendable parameters in accordance with the input through the user interface, obtain designated data and designated condition information designated by the user from the external program, the designated data being the image data subjected to the outputting operation, the designated condition information being information representing a condition identified by the external program in accordance with the input through the user interface, and cause the image outputting device to execute the outputting operation with respect to the designated data in accordance with the execution condition represented by the designated condition information.

BRIEF DESCRIPTION OF THE ACCOMPANYING DRAWINGS

FIG. 1 schematically shows a configuration of a system according to an illustrative embodiment of the present disclosures.

FIG. 3A shows an example of a recommendable parameter list stored in a server of the system shown in FIG. 1.

FIG. 3B shows an example of initial condition information stored in a memory of the information processing terminal shown in FIG. 1.

FIG. 9A is an example of an edit screen displayed on a display of the information processing terminal according to the modified embodiment.

FIG. 9B is an example of a print screen displayed on the display of the information processing terminal according to the modified embodiment.

DESCRIPTION OF EMBODIMENTS

Hereinafter, referring to the accompanying drawings, embodiments according to aspects of the present disclosures will be described. It should be noted that embodiments described below are only illustrative examples, which can be modified in various ways without departing from the aspects of the disclosures. For example, the order of execution steps described later may be changed as far as the aspects of the disclosures are not changed.

Figure 1:
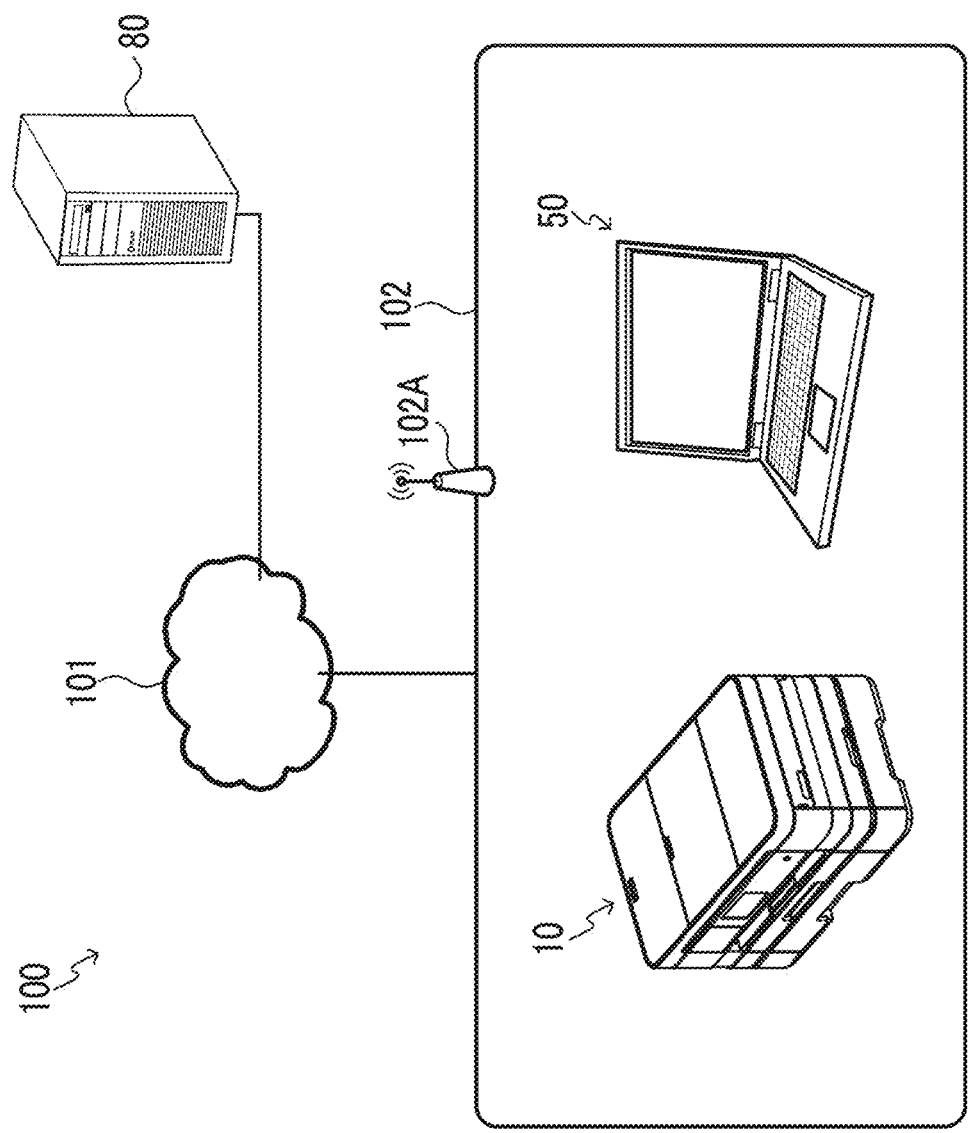

FIG. 1 schematically shows a configuration of a system 100 according to aspects of the disclosures. The system 100 shown in FIG. 1 includes an MFP (abbreviation of a multifunction peripheral) 10, an information processing terminal 50 and a server 80. The MFP 10, the information processing terminal 50 and the server 80 are connected through a communication network so as to be communicable with each other. The communication network need not be limited to a particular one, and could be, for example, the Internet 101, a wired LAN, a wireless LAN 102, or a combination thereof.

According to one illustrative embodiment, the MFP 10 and the information processing terminal 50 belong to the wireless LAN 102. That is, the MFP 10 and the information processing terminal 50 can communicate with each other via a not-shown access point of the wireless LAN 102. Further, the wireless LAN 102 is connected to the Internet 101 via a router 102A. Further, the server 80 is also connected to the Internet. Thus, the MFP 10 and the information processing terminal 50 can communicate with the server 80 via the router 102A and the Internet 101.

Local IP addresses are assigned to a wireless LAN 102 side port of the router 102A, a communication I/F 25 of the MFP 10, and a communication I/F 55 of the information processing terminal 50. To an Internet 101 side port of the router 102A, a global IP address is assigned. The router 102A relays the communication between the MFP 10 or the information processing terminal 50 and the server 80.

Specifically, the router 102A receives an IP packet from the MFP 10 or the information processing terminal 50. As source addresses of the IP packet, the local IP addresses of the MFP 10 or the information processing terminal 50 is set as a source address of the IP packets. Next, the router 102A overwrites the source address of the received IP packet with the global IP address assigned to the Internet 101 side port of the router 102A. Then, the router 102A transmits the IP packet of which source address has been overwritten to the server 80 via the Internet 101.

The MFP 10 and the information processing terminal 50 belong to a group. The group may be a country in which the MFP 10 and the information processing terminal 50 are placed, or an organization (e.g., a government office, a company, a school or the like) which possesses the MFP 10 and the information processing terminal 50. The group is identified by a group ID which is an example of group identification information. For example, an assignable range of the global IP address set to the router 102A is defined for each country, and further, the global IP addresses for an organization belong to the country are assigned from among the IP addresses within the assigned range. Thus, the global IP address set to the router 102A is an example of a group ID. It is noted that a concrete example of the group ID need not be limited to the global IP addresses, but country information representing the country in which, for example, the information processing terminal 50 is placed, or language information indicative of a language used in the information processing terminal 50. It is noted that the country information and the language information may be retained in the OS 64 of the information processing terminal 50, and can be obtained from the OS 64.

Figure 2A:
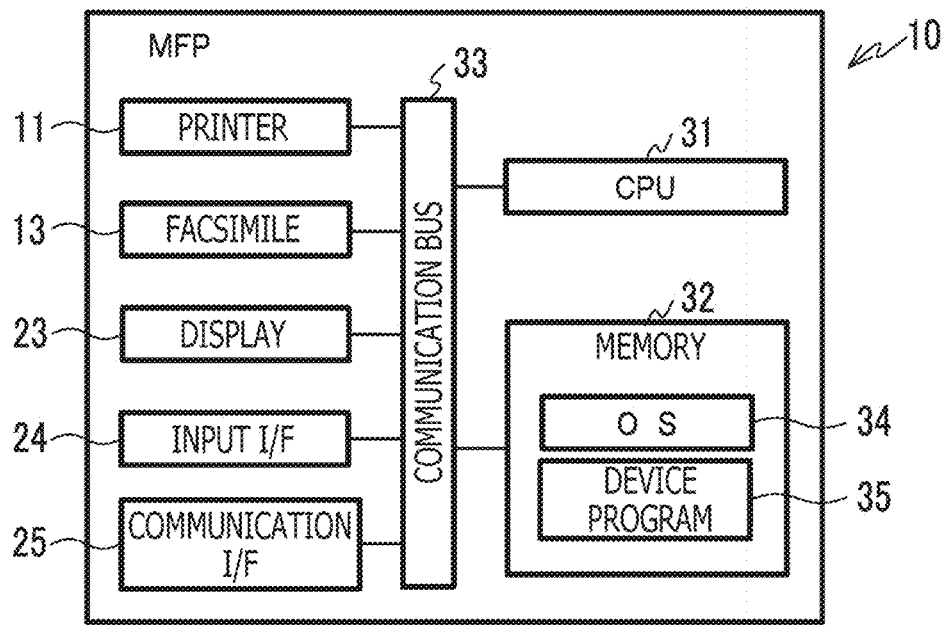
FIG. 2A is a block diagram of an MFP of the system shown in FIG. 1.

The MFP 10 mainly includes, as shown in FIG. 2A, a printer 11, a facsimile 13, a display 23, an input I/F 24, a communication I/F 25, a CPU 31, a memory 32 and a communication bus 33. Respective components of the MFP 10 are interconnected through the communication bus 33. The MFP 10 is an example of an image outputting device. The printer 11 and the facsimile 13 are examples of an image outputting section.

The printer 11 is configured to execute a printing operation to record images represented by image data on sheets. As a recording method of the printer 11, an inkjet printing method or an electrophotographic imaging method may be employed. The facsimile 13 is configured to execute a facsimile transmission operation to transmit image data to an external device in accordance with a facsimile protocol, and a facsimile receiving operation to receive image data from the external device in accordance with the facsimile protocol. The printing operation and the facsimile transmission operation are examples of an outputting operation.

The printer 11 executes the printing operation in accordance with an execution condition. The execution condition is defined by multiple items (e.g., "size", "color", "sheet type", "silent mode") and a parameter set to each of the multiple items. Specifically, as the parameter corresponding to the item "size", a size of the sheet on which the image is recorded (e.g., "A4", "B5", "Postcard") may be set. As the parameter corresponding to the item "color", a color to be used to record the image (e.g., "color", "monochrome") may be set. As the parameter corresponding to the item "sheet type", a type of the sheet on which the image is recorded (e.g., "plain", "glossy") may be set. As the parameter corresponding to the item "silent mode", a first value "ON" corresponding to a low-speed execution of the printing operation in which the printing operation is executed at a low printing speed with a relatively small sound, or a second value "OFF" corresponding to a high-speed execution of the printing operation in which the printing operation is executed at a high printing speed with a relatively large sound may be set. It is noted that the execution condition of the printing operation need not be limited to those explained above.

The facsimile 13 executes the facsimile transmitting and receiving operations in accordance with the execution condition. An example of the execution condition of the facsimile transmitting operation is defined by a combination of the parameter for an item "resolution" (e.g., 300 dpi, 600 dip or the like), and a parameter for an item "transmission destination" (e.g., a facsimile number). An example of the execution condition of the facsimile receiving operation is defined by a combination of a parameter of an item "color" (e.g., "color", or "monochrome") and a parameter for an item "output destination" (e.g., "sheet", or "memory").

The display 23 is an LCD, an organic EL display or the like, and has a display screen to display various pieces of information.

The input I/F 24 is a user interface configured to acquire an input operation by a user (hereinafter, also referred to as a user operation). Specifically, the input I/F 24 has buttons and transmits operation signals respectively corresponding to the operated buttons to the CPU 31. Optionally, the input I/F 24 may be provided with a film-like touch sensor overlaid on the display screen of the display 23. Operations to designate an object displayed on the display screen of the display 23 and/or operations to input character strings or numerical strings are examples of the user operation. It is noted that the term "object" includes character strings, icons, buttons, links, radio buttons, check boxes, pulldown menus and the like displayed on the display screen of the display 23.

The input I/F 24, when realized as the touch sensor, outputs position information indicative of a position, on the display screen, where the user has touched. It is noted that the term "touch" includes all the operations to cause an inputting medium to contact the display screen (i.e., the touch sensor). It is noted that "hovering" or "floating touch" which is an operation to cause the inputting medium to be located close to the display screen so that a distance between the inputting medium and the display screen is very small may be included in the concept represented by the term "touch". Further, the inputting medium could be a finger of the user, a touch pen and the like. A user operation to tap a position of an object displayed on the display screen (i.e., the touch sensor) of the display 23 is an example of a designating operation to designate the object.

The communication I/F 25 is an interface configured to enable communication with an external device through the communication network. That is, the MFP 10 is configured to transmit various pieces of information to the external device through the communication I/F 25 and/or receive various pieces of information from the external device through the communication I/F 25. A communication procedure employed in the communication I/F 25 need not be limited to a particular procedure, and Wi-Fi (registered trademark of Wi-Fi Alliance) may be employed, for example. When the MFP 10 and the information processing terminal 50 are connected with the USB cable or the like, the communication I/F 25 may be a USB interface configured such that a USB cable can be detachably attached thereto.

The CPU 31 is configured to control an entire operation of the MFP 10. The CPU 31 is configured to retrieve programs from the memory 32 based on various pieces of information input through the input I/F 24 and received from the external device through the communication I/F 25, and execute the same. The CPU 31 is an example of a processor, while the CPU 31 and the memory 32 constitute an example of a controller of the MFP 10.

The memory 32 stores an OS 34 and the device program 35. The device program 35 may be a single program or a collection of multiple programs. The memory 32 stores data and/or information which are necessary when the device program 35 is executed. The memory 32 may be configured, for example, by a RAM, a ROM, an EEPROM, an HDD, a portable recording medium such as a USB memory which can be detachably attached to the MFP 10, a buffer provided to the CPU 31, and/or any combination thereof.

The memory 32 may be a computer-readable storage medium. The computer-readable storage medium is a non-transitory medium. The non-transitory medium includes a recording medium such as a CD-ROM, a DVD-ROM and the like. It is noted that the non-transitory medium is also a tangible medium. It is noted that electrical signal carrying programs downloaded from a server on the Internet or the like is a computer-readable signal medium which is a kind of the computer-readable medium, but is not the non-transitory computer-readable storage medium. The above applies to a memory 62 of the information processing terminal 50 described later.

Figure 2B:
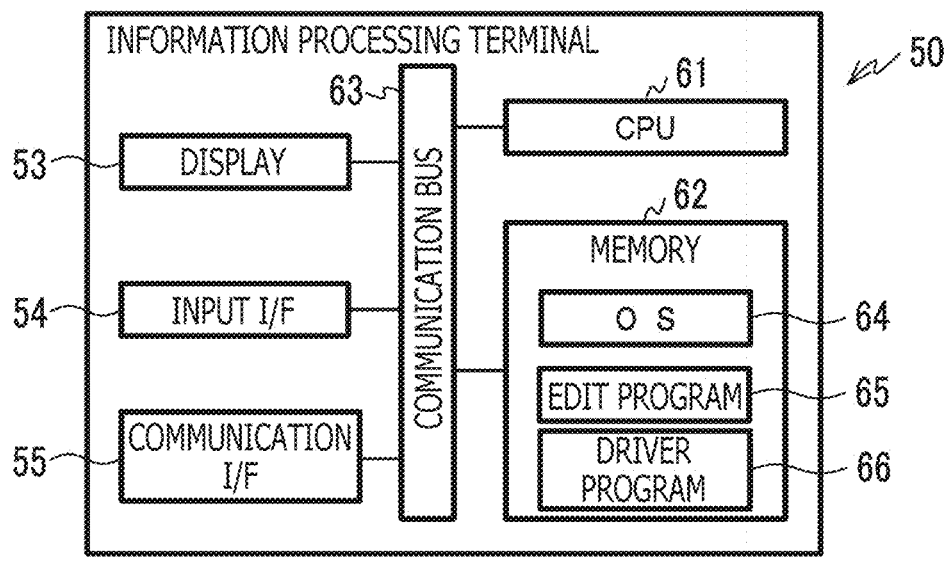
FIG. 2B is a block diagram of an information processing terminal of the system shown in FIG. 1.

The image processing terminal 50 mainly has, as shown in FIG. 2B, a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 are configured similarly to the display 23, the input I/F 24, the communication I/F 25, the CPU 31, the memory 32 and the communication bus 33 of the MFP 10, respectively, description thereof is omitted. It is noted that the CPU 61 is an example of a processor, while the CPU 61 and the memory 62 constitute an example of a controller of the information processing terminal 50. The information processing terminal 50 may be, for example, a feature phone, a smartphone, a tablet terminal, a PC or the like.

The memory 62 stores the OS 64, an edit program 65 and a driver program 66. The edit program 65 is an example of an external program for editing content data in accordance with user operations. The edit program 65 need not be limited to a specific program, and could be a program for editing text data, a program for editing images to be recorded on a communication side of a postcard, or the like. A format of the content data could be a text format, an image format, a spreadsheet format, a presentation format or the like. The driver program 66 is a program for instructing the MFP 10 to execute a printing operation in accordance with the instruction from the edit program 65.

The sever 80 is configured to store a recommendable parameter list, an example of which is shown in FIG. 3A. The recommendable parameter list includes one or more recommendable parameter record. The recommendable parameter record is registered with the recommendable parameter list by an administrator of the server 80 in accordance with, for example, a mode of use of the MFP 10 in a group that is identified by the group ID. The recommendable parameter record includes, for example, the group ID, a program ID, time information, and a recommendable parameter for a particular item. It is noted that the group ID, the program ID and the time information are used as key information to identify the recommendable parameter registered with the recommendable parameter list. It is further noted that a concrete example of the key information need not be limited to the above. For example, a part of the group ID, the program ID and the time information may not be included in the key information, and/or other information may be included in the key information.

Figure 4:
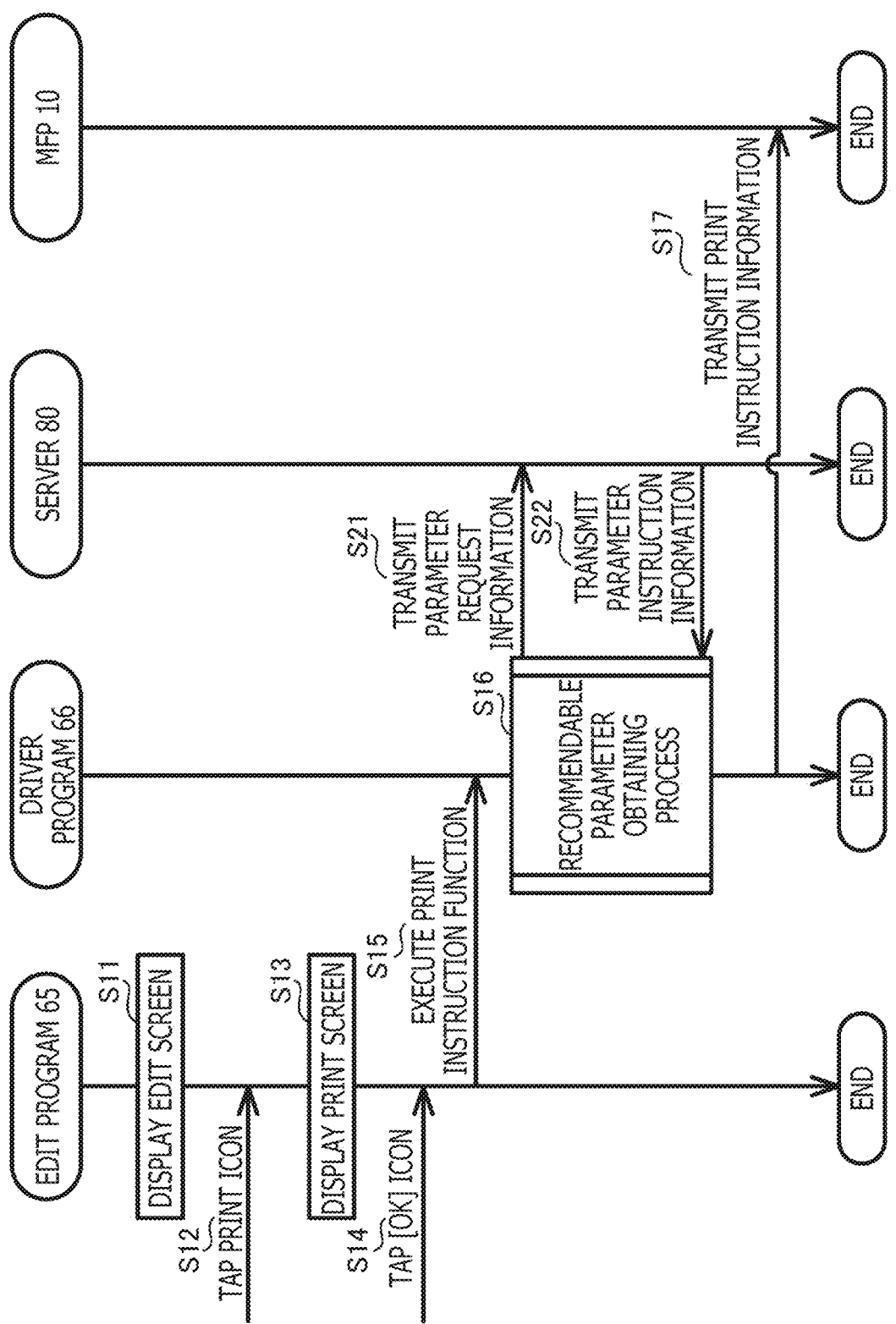
FIG. 4 shows an example of a process to execute a printing operation to print content data designated via an edit program.
Figure 5:
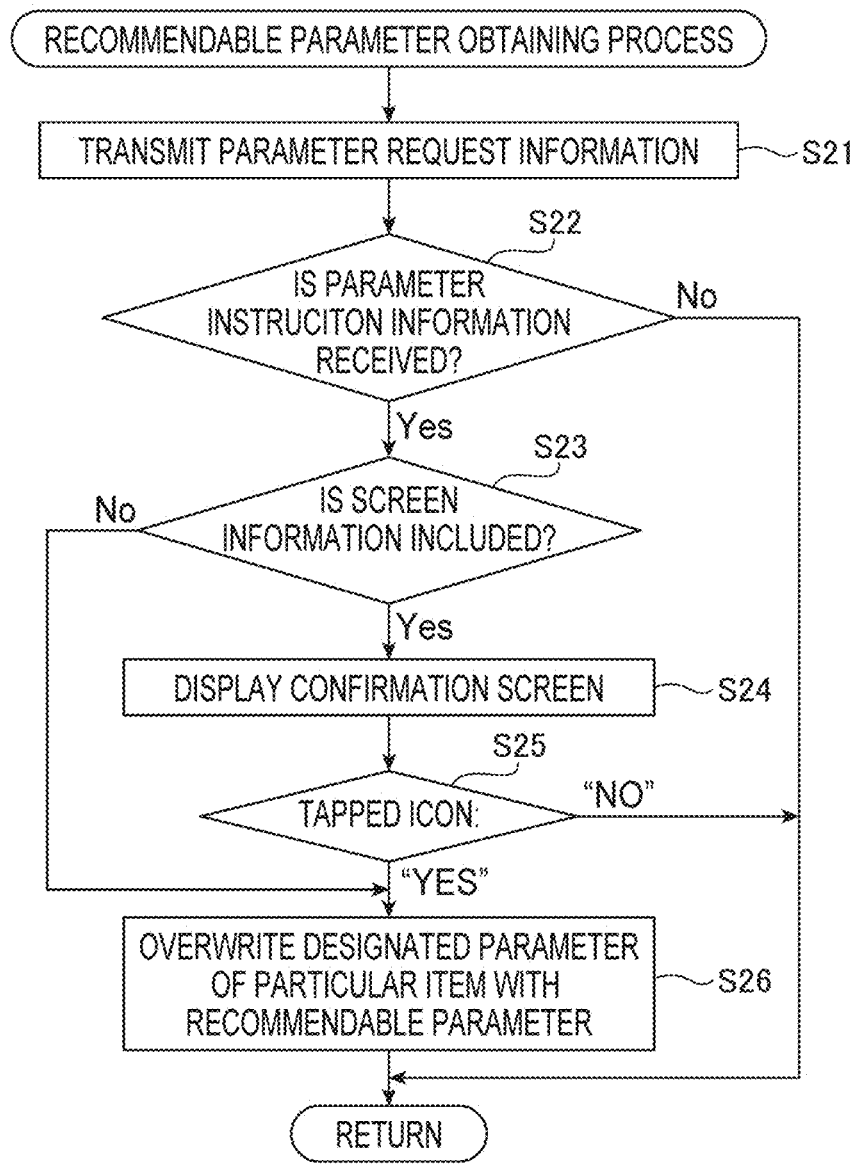
FIG. 5 is a flowchart illustrating a recommendable parameter obtaining process executed by the information processing terminal.

Referring to FIGS. 4 and 5, an operation of the system 100 according to the illustrative embodiment will be described. It is noted that, according to the illustrative embodiment, the MFP 10 and the information processing terminal 50 belong to an "A" country. Thus, one of a plurality of global IP addresses assigned to the "A" country is set to the router 102A. In the following description, an example of the edit program 65 for editing text-type content data will be explained.

It is noted that flowcharts shown in the accompanying drawings and description thereof basically show processes of the CPU's 31 and 61 in accordance with instructions described in programs. That is, processes of "determination", "extraction", "selection", "calculation", "identification" and the like in the following description correspond to processes performed by the CPU 31 and/or the CPU 61. It is further noted that the processes performed by the CPU 61 also include control of hardware via the OS 64. Further, "data" referred in the drawings and the specification is expressed by a bit string which is readable by a computer. Multiple pieces of data having substantially the same contents/meanings but different formats are treated as the identical data. So are the multiple pieces of information.

Figures 6A, 6B:
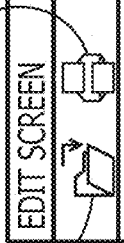
FIG. 6A is an example of an edit screen displayed on a display of the information processing terminal.
FIG. 6B is an example of a print screen displayed on the display of the information processing terminal.

Initially, the edit program 65 of the information processing terminal 50 causes the display 53 to display an edit screen shown in FIG. 6A on the display screen (S11). The edit screen is a screen allowing the user to edit the content data which could be subjected to the printing operation. As shown in FIG. 6A. the edit screen includes, for example, an open icon 111, a print icon 112 and an edit screen 113. Then, the edit program 65 acquires the user operations with respect to the edit screen 113 through the input I/F 54 (S12).

The edit program 65 displays a list of multiple pieces of content data which can be read on the display 53 in response to receipt of the user operation to designate the open icon 111 through the input I/F 54. Then, the edit program 65 receives the user operation to designate one of the multiple pieces of the content data in the list, and displays the edit screen 113 represented by the designated content data. Further, the edit program 65 edits the content data (i.e., reflects the user operation to edit in the displayed content data) in response to the user operation to designate edition of the edit screen 113 through the input I/F 54.

Then, in response to receipt of the user operation (e.g., a tap operation) to designate the print icon 112 through the input I/F 54 (S12), the edit program 65 temporarily stores the edited content data in the memory 62. It is noted that tapping of the print icon 112 is an example of the user operation to designate content data indicating the edit screen 113 as data subjected to the printing operation. The content data temporarily stored in the memory 62 is an example of designated data.

Next, the edit program 65 displays a print screen as shown in FIG. 6B on the display 53 (S13). The print screen is a screen allowing the user to designate execution condition of the printing operation to be used by the MFP 10. The print screen includes, for example, pull-down menus 121, 122 and 123, an [OK] icon 124 corresponding to an instruction to start executing the printing operation, and a preview image 125 showing an image when the image represented by the designated data would be printed on a sheet. Then, the edit program 65 is ready to receive the user operation with respect to the print screen through the input I/F 54 (S14).

The pull-down menus 121-123 correspond to the multiple items, "size", "color" and "silent mode" constituting the execution condition of the printing operation, respectively. Each of the pull-down menus 121-123 has multiple choices corresponding to candidates of the parameter. That is, the pull-down menu 121, which corresponds to the item "size", has three candidate choices (i.e., selectable parameters) of "A4", "B5" and "Postcard" for the item "size". The pull-down menu 122, which corresponds to the item "color", has two candidate choices (i.e., selectable parameters) of "Color" and "Monochrome" for the item "color". Further, the pull-down menu 123, which corresponds to the item "silent mode", has two candidate choices (i.e., selectable parameters) of "On" and "Off" for the item "silent mode".

In the print screen, each of the pull-down menus 121-123 is displayed such that one of the candidate choices of the parameter is indicated. In the example shown in FIG. 6B, the designated choices (i.e., parameters) "A4", "Color" and "Off" are displayed on the respective pull-down menus 121-123. The designated choices of the parameters are examples of designated parameters. The designated parameters (i.e., choices) "A4", "Color" and "Off" are temporarily stored, as designated condition information, in the memory.

In response to receipt of the user operation to change, for example, the designated parameter (i.e., choice) from "Color" to "Monochrome" using the pull-down menu through the input I/F 54, the edit program 65 changes the designated parameter from "Color" to "Monochrome" displayed on the pull-down menu 122, and overwrites the designated parameter "Color" temporarily stored in the memory 62 with the newly designated parameter "Monochrome". Similar processes are performed when the designated parameters are changed via the pull-down menus 121 and 123.

Next, in response to receipt of the user designation of the [OK] icon 124 through the input I/F 54 (S14), the edit program 65 calls a print instruction function defined in the OS 64 by designating a first pointer and a second pointer as arguments thereof (S15). The first pointer indicates a head address of an area of the memory 62 where the designated data is stored. The second pointer indicates a head address of an area of the memory 62 where the designated condition information. Next, in response to the print instruction function being called, the OS 64 calls a print instruction function defined in the driver program 66 by designating the first pointer and the second pointer, which are designated as arguments of the print instruction function.

Next, in response to the print instruction function being called, the driver program 66 obtains the first pointer and the second pointer, which are designated as the arguments (S15). It is noted that a process in which the print instruction function is called is an example of an obtaining process to obtain the designated data indicated by the first pointer and the designated condition information indicated by the second pointer from the edit program 65 via the OS 64.

In S16, the driver program 66 executes a recommendable parameter obtaining process. The recommendable parameter obtaining process is a process of obtaining recommendable parameters for particular items that are part of multiple items constituting the execution condition of the printing operation, which recommendable parameters are recommendable to a group to which the information processing terminal 50 belongs.

Hereinafter, referring to FIG. 5, the recommendable parameter obtaining process will be described in detail. Initially, the driver program 66 transmits parameter request information to the server 80 via the communication I/F 55 (S21). The parameter request information is information for requesting transmission of the recommendable parameters corresponding to the group to which the information process terminal 50 belongs. The parameter request information includes, for example, the designated condition information designated by the second pointer. Further, as a source address of an IP packet including the parameter request information, the global IP address of the router 102A is set when relayed by the router 102A. That is, the driver program 66 need not explicitly include the group ID in the parameter request information.

Although not shown in the drawings, the server 80 receives the parameter request information from the information processing terminal 50. Then, the server 80 extracts the global IP address as the group ID of "A Country" from the IP packet including the parameter request information. Next, the server 80 retrieves a recommendable parameter record including the group ID of "A COUNTRY" from the recommendable parameter list shown in FIG. 3A. Then, the server 80 compares the recommendable parameter "On" for the particular item of the "silent mode" with the designated parameter of "Off" for the item "Silent Mode" included in the retrieved recommendable parameter record.

Figure 7A:
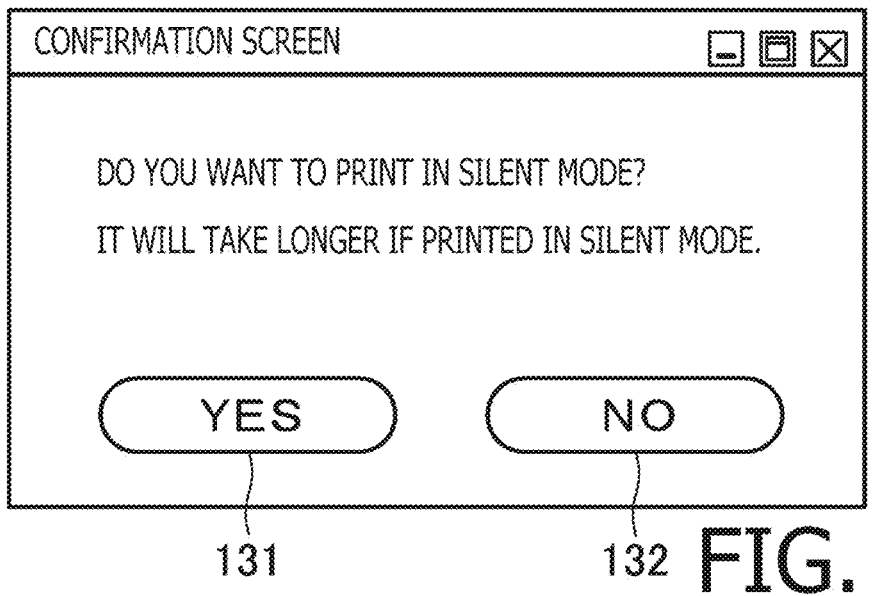
FIG. 7A is an example of a confirmation screen displayed on the display of the information processing terminal according to the illustrative embodiment.

In response to determination that the recommendable parameter for the particular item of "silent mode" is different from the designated parameter, the server 80 transmits the parameter instruction information to the information processing terminal 50. Oppositely, in response to determination that the recommendable parameter for the particular item of "silent mode" the same as the designated parameter, the server 80 does not transmit the parameter instruction information to the information processing terminal 50. It is noted that the parameter instruction information is information to instruct overwriting of the parameter for the particular item with the recommendable parameter. The parameter instruction information includes, for example, the recommendable parameter of "On" for the particular item of "Silent Mode" included in the retrieved recommendable parameter record, and screen information of a confirmation screen shown in FIG. 7A.

For example, the screen information includes text "DO YOU WANT TO PRINT IN SILENT MODE?" and "IT WILL TAKE LONGER IF PRINTED IN SILENT MODE.", a [YES] icon 131, a [NO] icon 132, a process corresponding to the [YES] icon 131 and a process corresponding to the [NO] icon 132. The [YES] icon 131 is an example of a first object, and the [NO] icon 132 is an example of the second object. The screen information is constituted by a script HTML, XML, Lua or the like, or a combination thereof. Further, the parameter instruction information may not include the screen information.

It is noted that the "process corresponding to the icon" is a process to be executed when the icon is tapped. In the regard, the process corresponding to the [YES] icon 131 is, for example, an over writing process (S26) to overwrite the designated parameter for the particular item of "silent mode" included on the designated condition information with the recommendable parameter of "On" and the output instruction process (S17) using the overwritten designated condition information. The process corresponding to the [NO] icon 132 is, for example, the output instruction process (S17) using the designated condition information obtained from the edit program 65.

Next, the driver program 66 receives parameter instruction information from the server 80 via the communication I/F 55 in response to the parameter request information (S22: YES). Then, when the received parameter request information includes screen information (S23: YES), the driver program 66 causes the display 53 to display a confirmation screen shown in FIG. 7A on the display 53 in accordance with the screen information (S24). The driver program 66 receives a user operation with respect to the confirmation screen via the input I/F 54 (S25).

Then, in response to receipt of designation of the [YES] icon 131 through the input I/F 54 (S25: YES), the driver program 66 overwrites the designated parameter "OFF" for the particular item of "SILENT MODE" with the recommendable parameter "ON" which is included in the parameter instruction information (S26), and terminates the recommendable parameter obtaining process. In response to receipt of designation of the [NO] icon 132 through the input I/F 54 (S25: NO), the driver program 66 skips S26 and terminates the recommendable parameter obtaining process.

In response to the parameter instruction information received in S22 not including the screen information (S23: NO), the driver program 66 skips S24-S25, executes S26, and terminates the recommendable parameter obtaining process. Further, in response to not receiving the parameter instruction information after the parameter request information was transmitted and before a particular time period has elapsed (S22: NO), the driver program 66 skips S23-S26, and terminates the recommendable parameter obtaining process.

Next, in S17 (FIG. 4), the driver program 66 transmits the print instruction information to the MFP 10 through the communication I/F 55. The print instruction is an example of output instruction information which causes a printing operation of designated data in accordance with the execution condition indicated by the designated condition information. The print instruction information includes, for example, designated data indicated by the first pointer and the designated condition information indicated by the second pointer. That is, the print instruction information, to which a process of S26 has been applied, includes designated condition information, which has been obtained from the edit program 65, and the designated parameter for the particular item of which has been overwritten with the recommendable parameter. In contrast, the print instruction information, to which the process of S26 has not been applied, includes the designated condition information obtained from the edit program 65.

Although not shown in the drawings, the device program 35 of the MFP 10 receives the print instruction information from the information processing terminal 50 through the communication I/F 25. The device program 35 causes the printer 11 to execute a printing operation in accordance with the print instruction information. That is, the printer 11 records the image designated by the designated data on the sheet in accordance with the execution condition indicated by the designated condition information.

<Effects>

According to the illustrative embodiment described above, it is possible to receive the recommendable parameter for the particular item which is associated with a group ID form the server 80, and customize the designated condition information in accordance with the received recommendable parameter. Thus, one driver program 66 can be used to cause the MFP 10 to execute the printing operations in accordance with appropriate execution conditions suitable to usage modes of the groups, respectively.

For example, it is assumed that the MFP 10 belonging to "A" country may execute the printing operation with the silent mode being set to "ON", while the MFP 10 belonging to a country other than the "A" country may execute the printing operation with the silent mode being set to "OFF". In such a case, even if the same driver program 66 is supplied to the MFP's belonging to a plurality of countries, an operation sound in the printing operation is low in the "A" country where a noise regulation is relatively strict, while a high-speed printing is executed in countries other than the "A" country. For another example, it is assumed that the MFP 10 of a C company may execute "monochrome" printing, while the MFP 10 of another country may execute "color" printing. Such a difference can be made simply by adjusting the parameters. With this configuration, usage amount of the color ink or the color toner can be reduced in the C company, which has relatively high cost consciousness.

Further, according to the above-described embodiment, the user is allowed to select, through the confirmation screen, whether the designated condition information is to be overwritten with the recommendable parameters received from the server 80. As a result, it becomes possible to cause the MFP 10 to execute the printing operation in accordance with the execution condition corresponding to the usage mode suitable to the user.

Still further, according to the above-described embodiment, the confirmation screen to be displayed on the display 53, and the icons 131 and 132 included in the confirmation screen are instructed by the server 80, the driver program 66 can be developed without considering the difference among the recommendable parameters for respective groups. It is noted, however, processes corresponding to the confirmation screen and/or icons may be described, for example, in a source code of the driver program 66.

Modified Embodiment

Hereinafter, referring to FIG. 8, a process according to a modified embodiment will be described. It is noted that detailed description on portions similar to the above-described illustrative embodiment will omitted, and portions different from the above-described embodiment will be mainly described. It is noted that the above-described embodiment and the modified embodiment described below could be combined within a range not departing from aspects of the disclosures.

In the modified embodiment, it is assumed that the MFP 10 and the information processing terminal 50 belong to "B" country. In the modified embodiment, an edit program 65 for editing content data, which has an image format to be recording on a communication side of a new year's greeting postcard, will be described. Further, it is assumed that a process described below is executed on December 15.

According to the modified embodiment, the memory 62 of the information processing terminal 50 stores initial condition information as shown in FIG. 3B. The initial condition information includes a plurality of items of "size", "color" and "sheet type" and corresponding parameters of "A4", "color" and "plain sheet" for the execution condition of the printing operation. The initial condition information is set, for example, by a developer of the driver program 66 as a combination of frequently-used parameters. Optionally, the initial condition information may be changed through the input I/F 54.

Figure 8:
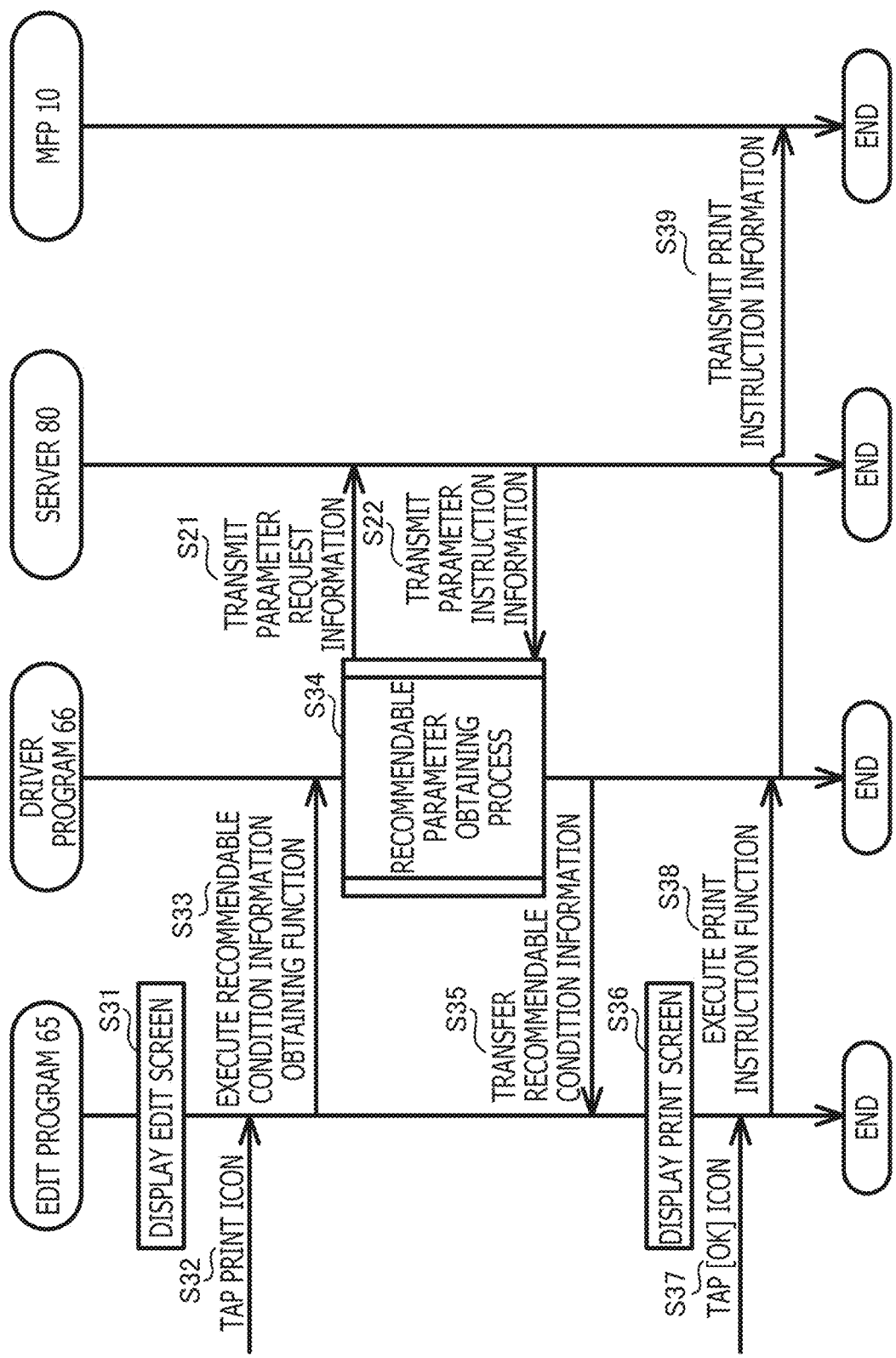
FIG. 8 shows another example of a process to execute a printing operation to print content data designated via an edit program.

In FIG. 8, firstly, the edit program 65 displays the edit screen as shown in FIG. 9A on the display 53 (S31). The edit screen includes an open icon 141, a print icon 142, an editable image 143, edit icons 144, 145 and 146. The open icon 141, the print icon 142, and the editable image 143 correspond to the open icon 111, the print icon 112 and the edit screen 113 shown in FIG. 6A, respectively. The edit icon 144 corresponds to an instruction to add character strings on the editable image 143. The edit icon 145 corresponds to an instruction to add colors on the editable image 143. The edit icon 146 corresponds to an instruction to add a photograph image on the editable image 143. The edit program 65 receives the user operation with respect to the editable image 143 through the input I/F 54 (S32).

Next, in response to receipt of designation of the edit icons 144-146 through the input I/F 54, the edit program 65 edits content data representing the editable image 143. Then, in response to receipt of the user operation to designate the print icon 142 through the input I/F 54 (S32), the edit program 65 temporarily stores the content data representing the editable image 143. It is noted that tapping of the print icon 142 is an example of a user operation to designate the content data representing the editable image 143 as subject of the printing operation. The content data temporarily stored in the memory 62 is an example of designated data.

Next, the edit program 65 calls a recommendable condition information obtaining function which is defined in the OS 64 by designating a program ID "postcard application" as an argument (S33). It is noted that the program ID "postcard application" is an example of program identifying information for identifying the edit program 65. Next, in response to the recommendable condition information obtaining function being called, the OS 64 calls the recommendable condition information obtaining function defined in the driver program 66 with designating the program ID which is designated as the argument of the recommendable condition information obtaining function as an argument.

Next, in response to the recommendable condition information obtaining function being called, the driver program 66 obtains the program ID of "postcard application" which is designated as the argument (S33). It is noted that the transfer requirement information is information to request for recommendable condition information suitable to the edit program 65 identified by the program ID of "postcard application". The transfer requirement information includes, for example, the program ID.

Next, the driver program 66 executes the recommendable parameter obtaining process (S34). That is, the driver program 66 transmits parameter request information to the server 80 through the communication I/F 55 (S21). According to the modified embodiment, the parameter request information includes the group ID of "B country", the program ID of "postcard application" which is obtained as the argument of the recommendable condition information obtaining function, and time information of "December" indicating the time, which includes current date and time obtained from a system clock (not shown). It is noted that the time information may be direct indications of the current date such as "December 15" or more indirect indications such as "winter", "around the end of the year" or the like.

Although not shown in the drawings, the server 80 receives the parameter request information from the information processing terminal 50. Then, the server 80 retrieves, from the recommendable parameter record, which includes the group ID of "B country", the program ID of "postcard", the time information of "December", the recommendable parameters of "postcard" and the "glossy" as the parameters for the particular items of "size" and the "sheet type", respectively, in the recommendable parameter list shown in FIG. 3A. Then, the server 80 transmits the parameter instruction information including the recommendable parameters of "postcard" and "glossy" for the particular items of "size" and the "sheet type" as retrieved and the screen information indicating the confirmation screen shown in FIG. 7B to the information processing terminal 50.

Figure 7B:
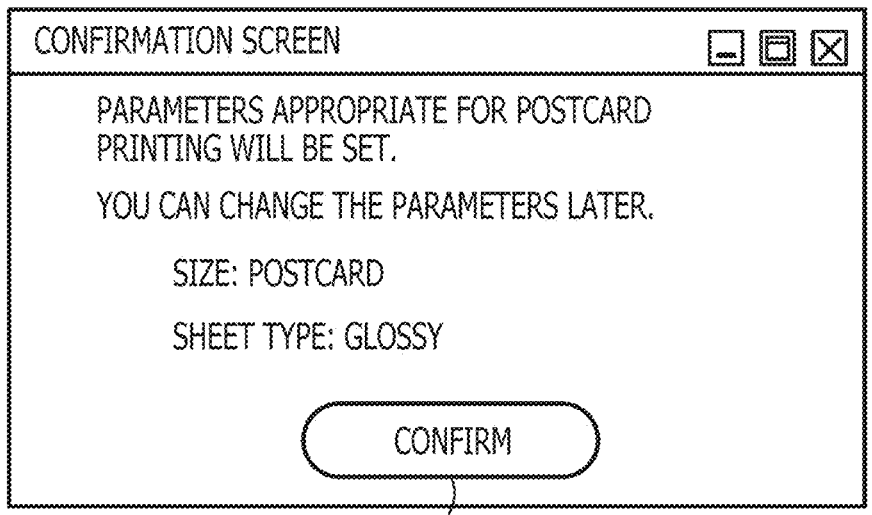
FIG. 7B is an example of a confirmation screen displayed on the display of the information processing terminal according to a modified embodiment.

As shown in FIG. 7B, the screen information according to the modified embodiment indicates a text "PARAMETER APPROPRIATE FOR POSTCARD PRINTING WILL BE SET. YOU CAN CHANGE THE PARAMETERS LATER." and recommendable parameters of "postcard" and "glossy" for particular items, a [CONFIRM] icon 132 which is an example of an object, and a process corresponding to the [CONFIRM] icon 132. The process corresponding to the [CONFIRM] icon 133 is, for example, a process of overwriting "A4" and "normal", which are initial parameters for the particular items of "size" and the "sheet type" with the recommendable parameters of "postcard" and the "glossy", respectively.

Next, the driver program 66 receives the parameter instruction information from the server 80 through the communication I/F 55 as a response to the parameter request information (S22: YES). Then, when it is determined that the received parameter request information includes the screen information (S23: YES), the driver program 66 displays the confirmation screen as shown in FIG. 7B on the display 53 in accordance with the screen information (S24). Thereafter, in response to receipt of designation of the [CONFIRM] icon 133 through the input I/F 54 (S25: YES), the driver program 66 overwrites "A4" and "plain" which are initial parameters for the particular items of the "size" and the "sheet type" included in the initial condition information with the recommendable parameters of "postcard" and the "glossy", respectively (S26). Thereafter, the driver program 66 terminates the recommendable parameter obtaining process.

Specifically, the driver program 66 copies the initial condition information in a work area of the memory 62, and applies an overwriting process (S6) with respect to the copied initial condition information. It is noted that the initial parameter for the Item of "color" (i.e., "color") will not be overwritten. The initial condition information of which parameters are overwritten with the recommendable parameters is an example of the recommendable condition information. Thereafter, the driver program 66 designates the pointer indicating the head address of the recommendable condition information as the return value of the recommendable condition information obtaining function, and terminates the recommendable condition information obtaining function (S35).

Next, the edit program 65 obtains the recommendable condition information as the return value of the recommendable condition information obtaining process, and temporarily stores the obtained recommendable condition information in the memory 62 as the designated condition information (S35). Next, the edit program 65 displays the print screen as shown in FIG. 9B on the display 53 (S36). The print screen includes pull-down menus 151, 152 and 153, an [OK] icon 154, a preview image 155 indicating a state where the designated data is recorded on the sheet. Thereafter, the edit program 65 receives the user operation with respect to the print screen through the input I/F 54 (S37).

The pull-down menus 151-153 respectively correspond to multiple items of "size", "color" and "sheet type", which constitute the execution condition of the printing operation. When the print screen is displayed, the pull-down menus 151-153 are displayed such that the parameters "postcard", "color" and "glossy", which are included in the recommendable condition information obtained from the driver program 66, are selected. Further, the edit program 65 is configured to acquire the user operations to designate change of respective parameters designated by the pull-down menus 151-153 through the input I/F 54.

In response to receipt of designation of the [OK] icon 154 through the input I/F 54 (S37), the edit program 65 calls the print instruction function defined by OS 64 with designating the first pointer and the second pointer as its arguments (S38). It is noted that the processes of S38 and S39 are similar to those in S15 and S17.

According to the modified embodiment, it becomes possible to transfer the recommendable condition information, which includes the recommendable parameters associated with the group ID, the program ID and the time information, to the edit program 65. Therefore, it becomes possible to encourage the user of the information processing terminal 50 to execute the printing operation in accordance with the execution condition represented by the recommendable condition information. For example, in the "B" country which has a culture of exchanging New Year's greeting postcards, when the postcard application requests the recommendable condition information in December, the recommendable condition information appropriate to record an image on the communication side of the New Year's greeting postcard is transferred. According to such a configuration, the user operations to change the execution condition could be reduced, and the New Year's greeting postcards can be created easily with less failure.

Further, according to the modified embodiment, it is possible to make the user recognize, through the confirmation screen, that the execution condition represented by the recommendable condition information can be chanted with use of the edit program 65. According to such a configuration, it becomes possible to cause the MFP 10 to execute the printing operation in accordance with various execution conditions respectively suitable to various usage forms.

Further, according to the modified embodiment, in the initial condition information stored in the memory 62, the parameters for the particular items are overwritten with the recommendable parameters, the number of management items in the server 80 can be reduced in comparison with a case where the recommendable parameters for all the items are to be registered with the recommendable parameter record.

In the illustrative embodiment and the modified embodiment, the recommendable parameters obtaining process is executed by the driver program 66 installed in the information processing terminal 50. That is, the information processing terminal 50 is an example of a computer connected with the printer 11 through the communication network. It is noted that the recommendable parameter obtaining process may be executed by the CPU 31 of the MFP 10. In such a case, the CPU 31 is another example of the computer connected with the printer 11 through the communication bus 33 which is an example of an inner bus.

According to the illustrative embodiment and modifications, the processes executed by the controllers are realized as the programs stored in the memories 32 and 36 are executed by the CPU's 31 and 61. It should be noted that configurations of respective controllers need not be limited to those described above. All or part of the configurations may be realized by hardware such as integrated circuits.

It is further noted that the above configuration can be realized not only by the MFP 10 and the information processing terminal 50, but can also be realized by programs causing the MFP 10 and the information processing terminal 50 to execute the respective processes. Such programs could be supplied/distributed as one recorded in a non-transitory recording medium. The non-transitory recording medium could be a CD-ROM, a DVD-ROM, or a storage device implemented in a server which is connectable to the MFP 10 and/or the information processing terminal 50 through the communication network. Further, the programs stored in such a server may be delivered to the MFP 10 and/or the information processing terminal 50 through the communication network (e.g., the Internet) as information or signals representing the programs.

What is claimed is:

1. A non-transitory computer-readable recording medium for a computer which has a processor, a memory, a user interface and a communication interface, the computer being connected to an image outputting device configured to execute an outputting operation in accordance with image data, the non-transitory recording medium storing instructions which cause, when executed by the processor, the computer to execute:

receiving an output instruction instructing output of the image data;

obtaining designated condition information indicating multiple designated parameters respectively corresponding to multiple items constituting the execution condition for the outputting operation;

transmitting parameter request information to a server through the communication interface, the parameter request information including key information indicating a current status of the computer, the parameter request information being information requesting the server to transmit recommendable parameters corresponding to particular items which are parts of the multiple items, the recommendable parameters being parameters relating to the key information;

receiving parameter instruction information including the recommendable parameters from the server through the communication interface as a response to the parameter request information; and outputting output instruction information to cause the image outputting device to execute the outputting operation using the recommendable parameters included in the parameter instruction information as the parameters for the particular items, and using the designated parameters for the other items.

2. The non-transitory computer-readable recording medium according to claim 1,
wherein the key information includes group information identifying a group to which the computer belongs.

3. The non-transitory computer-readable recording medium according to claim 1,
wherein the key information includes program information relating to a program being executed by the computer.

4. The non-transitory computer-readable recording medium according to claim 1,
wherein the key information includes time information indicating a time when the computer operates.

5. The non-transitory computer-readable recording medium according to claim 1,
wherein the parameter request information includes the designated parameters for the particular items,
wherein the instructions cause, when executed by the processor, the computer to receive the parameter instruction information such that, only when the designated parameters are different from the recommendable parameters, the computer receives the parameter instruction information transmitted from the server, and wherein the instructions cause, when executed by the processor, the computer to make the image outputting device execute the outputting operation using the designated parameters as either the parameters for the particular items or the parameters for other items when the parameter instruction information is not received before elapse of a particular time period since the parameter request information has been transmitted.

6. The non-transitory recording medium according to claim 2, where the instructions further cause, when executed by the processor, the computer to execute:

overwriting the designated parameters for the particular items included in the designated condition information with the recommendable parameters included in the parameter instruction information; and causing the image outputting device to execute the outputting operation in accordance with the execution condition represented by the designated condition information having been overwritten with the recommendable parameters.

7. The non-transitory computer-readable recording medium according to claim 3,
wherein the computer has a display,
wherein the instructions cause, when executed by the processor, the computer to execute:

displaying a confirmation screen including a first object and a second object on the display, the first object corresponding to an instruction to execute overwriting of the designated parameters with the recommendable parameters, the second object corresponding to an instruction not to execute the overwriting of the designated parameters with the recommendable parameters;

receiving an input related to the confirmation screen through the user interface;

executing the overwriting of the designated parameters with the recommendable parameters and causing the image outputting device to execute the outputting operation in response to receipt of the input, through the user interface, designating the first object on the confirmation screen; and causing the image outputting device to execute the outputting operation without executing the overwriting of the designated parameters with the recommendable parameters in response to receipt of the input, through the user interface, designating the second object on the confirmation screen.

8. The non-transitory computer-readable recording medium according to claim 3,
wherein the computer has a display and an input interface,
wherein the parameter instruction information contains screen information which indicates a confirmation screen including a text and an object, and a process corresponding to the object;
wherein the instructions further cause, when executed by the processor, the computer to execute:

displaying the confirmation screen indicated by the screen information on the display;

receiving an input, through the user interface, related to the confirmation screen through the input interface; and when the input received through the user interface is to designate the object, executing the process corresponding to the object.

9. The non-transitory computer-readable recording medium according to claim 1,
wherein the computer is connected to the image outputting device through the communication network, and
wherein the instructions cause, when executed by the processor, the computer to transmit the output instruction information to the image outputting device through the communication interface when the image outputting device is to be caused to execute the outputting operation, the output instruction information including the designated condition information.

10. The non-transitory computer-readable recording medium according to claim 1,
wherein the image data and the designated condition information are obtained from an external program stored in the memory, the image data being generated by the external program.

11. A non-transitory computer-readable recording medium for a computer which has a processor, a memory, a user interface and a communication interface, the computer being connected to an image outputting device configured to execute an outputting operation in accordance with image data,
the non-transitory recording medium storing instructions which cause, when executed by the processor, the computer to execute:
receiving an output instruction instructing output of the image data;
obtaining, from an external program stored in the memory, transfer requirement information requesting to transfer recommendable condition information, the recommendable condition information including multiple parameters respectively corresponding to multiple items constituting an execution condition of the outputting operation;
transmitting parameter request information to a server through the communication interface, the parameter request information including key information indicating a current status of the computer, the parameter request information being information requesting the server to transmit recommendable parameters corresponding to particular items which are parts of the multiple items, the recommendable parameters being parameters relating to the key information;
receiving parameter instruction information including the recommendable parameters associated with the key information from the server through the communication interface as a response to the parameter request information;
transferring the recommendable condition information including the recommendable parameters included in the parameter instruction information to the external program in response to the transfer requirement information so that the external program can identify the recommendable parameters in accordance with the input through the user;
obtaining designated condition information, from the external program, the designated condition information being information representing a condition identified by the external program in accordance with the input through the user interface; and
outputting instruction information to cause the image outputting device to execute the outputting operation in accordance with the execution condition represented by the designated condition information.

12. The non-transitory computer-readable recording medium according to claim 11,
wherein the key information includes group information identifying a group to which the computer belongs.

13. The non-transitory computer-readable recording medium according to claim 11,
wherein the key information includes program information identifying the external program.

14. The non-transitory computer-readable recording medium according to claim 11,
wherein the key information includes time information represent current date and time.

15. The non-transitory computer-readable recording medium according to claim 11,
wherein the computer has a display and an input interface,
wherein the instructions further cause, when executed by the processor, the computer to execute:
making a notification that the execution condition represented by the recommendable condition information can be modified through the external program and displaying a confirmation screen including an object corresponding to confirmation of the notification on the display,
receiving an input, through the user interface, related to the confirmation screen, and
transferring the recommendable condition information in response to receipt of the input, through the user interface, to designate the object.

16. The non-transitory computer-readable recording medium according to claim 11,
wherein the memory stores initial condition information which includes multiple initial parameters respectively corresponding to the multiple items,
wherein the instructions further cause, when executed by the processor, the computer to execute:
overwriting the initial parameters for the particular items included in the initial condition information with the recommendable parameters included in the parameter instruction information; and
the initial condition information overwritten with the recommendable parameters is transferred in the transferring to the external program as the recommendable condition information.

17. The non-transitory computer-readable recording medium according to claim 11,
wherein the computer has a display and an input interface,
wherein the parameter instruction information contains screen information which indicates a confirmation screen including a text and an object, and a process corresponding to the object;
wherein the instructions further cause, when executed by the processor, the computer to execute:
displaying the confirmation screen indicated by the screen information on the display;
receiving an input, through the user interface, relating to the confirmation screen through the input interface; and
when the input, received through the user interface, is to designate the object, executing the process corresponding to the object.

18. The non-transitory computer-readable recording medium according to claim 11,
wherein the computer is connected to the image outputting device through the communication network, and
wherein the instructions cause, when executed by the processor, the computer to transmit the output instruction information to the image outputting device through the communication interface when the image outputting device is to be caused to execute the outputting operation, the output instruction information including the designated condition information.

19. An image outputting system, comprising:
a computer including a processor, a memory, a user interface and a communication interface; and
an image outputting device configured to execute an outputting operation in accordance with image data, the image outputting device being connected with the computer,
the processor of the computer is configured to perform:
  receiving an output instruction instructing output of the image data through the user interface;
  obtaining designated condition information indicating multiple designated parameters respectively corresponding to multiple items constituting an execution condition for the outputting operation;
  transmitting parameter request information to a server through the communication interface, the parameter request information including key information indicating a current status of the computer, the parameter request information being information requesting the server to transmit recommendable parameters corresponding to particular items which are parts of the multiple items, the recommendable parameters being parameters relating to the key information;
  receiving parameter instruction information including the recommendable parameters from the server through the communication interface as a response to the parameter request information; and
  outputting output instruction information to cause the image outputting device to execute the outputting operation using the recommendable parameters included in the parameter instruction information as the parameters for the particular items, and using the designated parameters for the other items, and
the image outputting device performing the outputting operation in response to receipt of the output instruction information output by the computer.

20. An image outputting system, comprising:
a computer including a processor, a memory, a user interface and a communication interface; and
an image outputting device configured to execute an outputting operation in accordance with image data, the image outputting device being connected with the computer,
the processor of the computer is configured to perform:
  receiving an output instruction instructing output of the image data;
  obtaining, from an external program stored in the memory, transfer requirement information requesting to transfer recommendable condition information, the recommendable condition information including multiple parameters respectively corresponding to multiple items constituting an execution condition of the outputting operation;
  transmitting parameter request information to a server through the communication interface, the parameter request information including key information indicating a current status of the computer, the parameter request information being information requesting the server to transmit recommendable parameters corresponding to particular items which are parts of the multiple items, the recommendable parameters being parameters relating to the key information;
  receiving parameter instruction information including the recommendable parameters associated with the key information from the server through the communication interface as a response to the parameter request information;
  transferring the recommendable condition information including the recommendable parameters included in the parameter instruction information to the external program in response to the transfer requirement information so that the external program can identify the recommendable parameters in accordance with the input through the user;
  obtaining designated condition information, from the external program, the designated condition information being information representing a condition identified by the external program in accordance with the input through the user interface; and
  outputting output instruction information to cause the image outputting device to execute the outputting operation in accordance with the execution condition represented by the designated condition information, and
the image outputting device performing the outputting operation in response to receipt of the output instruction information output by the computer.

* * * * *